(12) United States Patent
Garney et al.

(10) Patent No.: US 6,351,783 B1
(45) Date of Patent: Feb. 26, 2002

(54) METHOD AND APPARATUS FOR ISOCHRONOUS DATA TRANSPORT OVER AN ASYNCHRONOUS BUS

(75) Inventors: John I. Garney, Portland; Brent S. Baxter, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/315,859

(22) Filed: May 20, 1999

(51) Int. Cl.[7] ............................................. G06F 13/14
(52) U.S. Cl. .................. 710/107; 710/112; 710/39; 710/40
(58) Field of Search ................. 710/107–125, 710/36–45, 240–244

(56) References Cited

U.S. PATENT DOCUMENTS

| | | | | |
|---|---|---|---|---|
| 4,549,292 A | * | 10/1985 | Isaman et al. | 370/424 |
| 5,329,531 A | * | 7/1994 | Diepstraten et al. | 370/347 |
| 5,396,494 A | * | 3/1995 | Roposh | 370/439 |
| 5,487,170 A | * | 1/1996 | Bass et al. | 710/244 |
| 5,488,695 A | * | 1/1996 | Cutter | 710/110 |
| 5,528,513 A | * | 6/1996 | Vaitzblit et al. | 709/103 |
| 5,621,898 A | * | 4/1997 | Wooten | 710/117 |
| 5,758,105 A | | 5/1998 | Kelley et al. | |
| 5,784,569 A | * | 7/1998 | Miller et al. | 709/235 |
| 5,790,522 A | * | 8/1998 | Fichou et al. | 370/236 |
| 5,812,799 A | * | 9/1998 | Zuravleff et al. | 710/128 |
| 5,898,892 A | * | 4/1999 | Gulick et al. | 711/118 |
| 5,948,081 A | * | 9/1999 | Foster | 710/40 |
| 5,982,779 A | * | 11/1999 | Krishnakumar et al. | 370/447 |
| 6,018,513 A | * | 1/2000 | Okamoto et al. | 370/212 |
| 6,032,211 A | * | 2/2000 | Hewitt | 710/107 |
| 6,041,354 A | * | 3/2000 | Biliris et al. | 709/226 |
| 6,148,357 A | * | 11/2000 | Gulick et al. | 710/128 |
| 6,205,524 B1 | * | 3/2001 | Ng | 711/151 |

FOREIGN PATENT DOCUMENTS

| | | |
|---|---|---|
| EP | 0658841 A2 | 6/1995 |
| WO | WO 96/13777 | 5/1996 |

\* cited by examiner

*Primary Examiner*—Sumati Lefkowitz
(74) *Attorney, Agent, or Firm*—Charles A. Mirho

(57) ABSTRACT

A method includes setting a contention scheme for an asynchronous bus such that the contention delay of isochronous transactions on the asynchronous bus is bounded. A first device is coupled to the asynchronous bus to receive an isochronous transaction from an isochronous device and output the isochronous transaction to the asynchronous bus. A second device is coupled to the asynchronous bus to receive the isochronous transaction from the asynchronous bus and output the isochronous transaction to a third device.

18 Claims, 2 Drawing Sheets

METHOD AND APPARATUS FOR ISOCHRONOUS DATA TRANSPORT OVER AN ASYNCHRONOUS BUS

BACKGROUND

1. Field

The invention relates to the field of data transport, and more particularly, to isochronous data transport over an asynchronous bus.

2. Background Information

In digital systems, data may be transferred between devices and a shared resource (for example, a memory). The data may be transferred in units known as transactions. A transaction is collection of information necessary to initiate or complete an operation, such as an operation to read data from memory or write data to memory. A shared bus may be employed for such transactions. The bus may employ various contention strategies to manage concurrent demands for the bus from multiple devices. Arbitration rules commonly depend on some form of priority settings to resolve access contention. One strategy of contention resolution is often referred to as "asynchronous". Asynchronous strategies depend more strongly on priorities assigned to contending uses than on timely disposition of individual transactions. A transaction (for example a read or write request) may occasionally encounter long, unpredictable delays while pending transfer over an asynchronous bus.

Buses employing asynchronous contention resolution may be subject to several factors that interfere with timely transfer of transactions. Typically, an entire transaction may be transferred across the bus before control of the bus is relinquished to other transactions. While a transaction is in progress, a pending transaction (one awaiting transfer over the bus) must await the next arbitration opportunity. An arbitration opportunity is a point in time at which the control logic for the bus determines which transaction pending on the bus will be next transferred. Time thus spent is referred to as "collision delay".

Once the current transaction is ended the pending transaction may encounter further delay. This further delay may result when another transaction is pending with higher priority. This is referred to as "arbitration delay".

Once the pending transaction obtains access to the bus, a finite time may elapse before the transaction has been transferred in its entirety across the bus. This is referred to as "transmission delay". All three types of delay are common in buses employing priority-based contention resolution, i.e. asynchronous buses.

The combined effect of these delays may be to render the completion time of a transaction unpredictable and unbounded. Many media-oriented devices (audio and video capture and playback devices, for example) may depend on timely transactions for correct operation. Isochronous devices require the transfer of up to a specified maximum amount of data X, via one or more transactions, during each period in a series of time periods of fixed duration T. This requirement (henceforth referred to as the isochronous X-T contract) may be difficult to accomplish in light of the unpredictable delivery times afforded by asynchronous data transfer strategies.

Supporting isochronous devices using an asynchronous bus may be accomplished using various buffering and flow-control techniques. However, many buffering techniques rely upon excessive buffer sizes. These excessive buffer sizes attempt to account for the unpredictable delays inherent with asynchronous buses. Excessive buffering may add undesirable processing delay, cost, and circuit size to components that implement an X-T contract. Flow-control may add unnecessary complexity to such components as well.

SUMMARY

A method includes setting a contention scheme for an asynchronous bus such that the contention delay of isochronous transactions on the asynchronous bus is bounded. A first device is coupled to the asynchronous bus to receive an isochronous transaction from an isochronous device and output the isochronous transaction to the asynchronous bus. A second device is coupled to the asynchronous bus to receive the isochronous transaction from the asynchronous bus and output the isochronous transaction to a third device.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications can be made which nonetheless all within the scope of the present invention.

An embodiment of the invention is described to set the bounds and conditions under which isochronous transactions may be transferred across an asynchronous bus. Such isochronous transactions may be transferred in accordance with a specified isochronous X-T contract (up to X bytes of data processed every T seconds). In accordance with the present invention, it may be possible to accurately determine and bound collision, arbitration and transmission delays for the transactions on the asynchronous bus. It may thus be possible to more accurately determine an amount of FIFO buffering to meet the isochronous X-T contract. Consequently, isochronous data and asynchronous data may be transferred over an asynchronous bus in accordance with an X-T contract. Excessive buffer sizes and flow control may be avoided.

One embodiment provides for the transport of up to a specified maximum amount of data (X) each isochronous period (T) across an asynchronous bus. In one embodiment, the asynchronous bus may be half-duplex. On a half-duplex bus data may be transmitted in either direction but not in both directions simultaneously.

Figure 1:
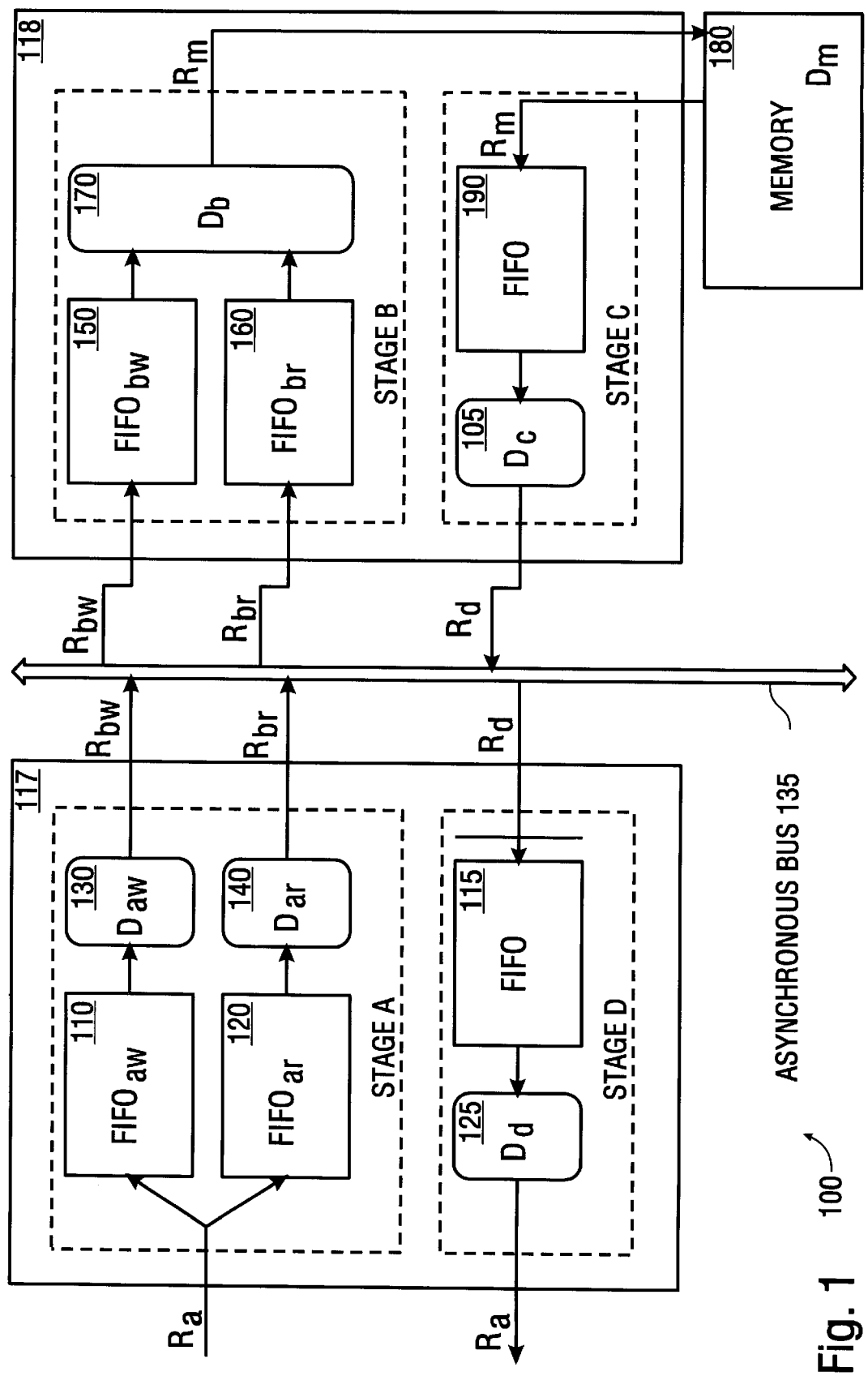
FIG. 1 is a schematic diagram illustrating an embodiment of an isochronous data transport in accordance with the present invention.

FIG. 1 illustrates a four stage embodiment 100 of a device to provide isochronous data transport in accordance with the present invention. Such a device may be referred to as an isochronous data transport or simply isochronous transport. The invention is not limited in scope to four stages. Other data transport embodiments may comprise a different number of stages. The figure illustrates one embodiment of the invention, however the invention applies to any asynchronous bus in accordance with the constraints and bounding conditions described herein. For example, the invention applies to full duplex links as well as half-duplex links.

The sections, stages and buffers employed by embodiment 100 will now be described. The flow of transactions between stages and buffers is also described for this embodiment.

Each stage in the illustrated embodiment comprises one or more First-In-First-Out (FIFO) buffers. FIFOs are of sufficient size to tolerate delays associated with the contention resolution strategy employed by asynchronous bus 135. Stage A FIFOs 110,120 may store signals for transactions (henceforth referred to as simply "transactions") awaiting transfer across bus 135. FIFOs 150,160 in stage B may store transactions awaiting access to the memory system. Bus 135 couples stage A to stage B and may comprise, for example, a bus conforming to Peripheral Component Interconnect (PCI) Specification Rev. 2.2, issued Jun. 1, 1995 and available from the PCI Special Interest Group at www.pcisig.com. Likewise, stage C and stage D may be coupled by the same bus 135. The nature of the bus may vary with implementation and may comprise, for example, a half-duplex serial or parallel bus or a full-duplex serial or parallel bus.

The illustrated embodiment 100 shows an isochronous transport comprising two sections. One section 117 interfaces isochronous devices with the bus 135. Another section 118 interfaces bus 135 with the memory system 180. Those skilled in the art will appreciate that both sections may be implemented within a single circuit package. Also, the invention is not limited to two sections but is illustrated in two sections for purposes of simplicity. In should be appreciated that memory 180 is only one example of the devices and circuits which may be coupled to section 118. In this embodiment, all isochronous transactions (for example, read requests and write requests from/to memory 180) enter the isochronous transport at stage A. Examples of the types of transactions which may enter at stage A include a read request transaction and a write request transaction. The read request transaction may comprise an address in memory from which data is returned in a read return transaction. A write transaction may comprise an address specifying the destination in memory to which the data is to be stored. The write transaction may also comprise the data to write. A write request may or may not result in a return transaction, depending upon the implementation. In one embodiment, asynchronous devices may share the bus 135 with the isochronous transport 100. These asynchronous devices may cause asynchronous transactions to pass over the asynchronous bus 135. These asynchronous transactions do not pass through the illustrated FIFOs of the isochronous transport 100.

An isochronous device may submit a read request transaction to the memory system 180. The data returned to the device in response to a read request transaction is called a read return transaction. In one embodiment in which write transactions do not generate a response, stage C receives only read return transactions from the memory system 180. Stage C passes these read return transactions along to stage D via the bus 135. Stage D passes the read return transactions out of the isochronous transport 100 to the isochronous device (not shown). Read return transactions reach the device a number of isochronous periods (T) following the read request transaction to which they are responsive. The number of isochronous periods (T) following the read request transaction is determined by the X-T contract.

The rates at which data is transferred into the various stages are now described. The delays encountered at the output of each stage are also described.

In one embodiment, buffers are used between stages. The buffers provide storage to transactions transferred between stages. Stage A comprises FIFOs 110 and 120. FIFO 120 may store read requests received from a isochronous device external to the isochronous transport. FIFO 110 may store write requests received from the isochronous device. Read FIFO 120 has an associated output delay Dar 140. Likewise, write FIFO 110 has an associated output delay Daw 130. These are the delays encountered by transactions leaving Stage A for the bus 135. Stage B comprises write request FIFO 150 coupled to write request FIFO 110 in stage A. Coupling between the stages is provided by way of bus 135. Stage B further comprises read request FIFO 160 coupled to read request FIFO 120 in stage A. Stage B output is coupled to memory 180. Stage B has an associated output delay Db 170. This is the delay encountered by transactions leaving Stage B for memory 180. In one embodiment Stage B delay Db 170 may be assumed the same for read FIFO 160 and write FIFO 150 because of the high I/O speed of the memory 180.

Stage C comprises read return FIFO 190 and output delay Dc 105. FIFO 190 is coupled by way of bus 135 to read return FIFO 115 in stage D. Stage D has output delay Dd 125. Write request FIFOs may not be employed in stages C and D if write requests do not generate return transactions from memory 180.

Those skilled in the art will appreciate that the delay blocks represented in FIG. 1 may not represent actual circuits. Instead, such delay blocks are provided to illustrate the location within the isochronous transport at which delays may be encountered by transactions moving through the isochronous transport.

A path for transactions to follow from the isochronous device to memory 180 includes Stages A and B. Transactions may be received by FIFOs 110,120 at isochronous rate Ra in accordance with the X-T contract. Transactions may be transported from FIFOs 110,120 over bus 135 at rate Rby to FIFOs 150,160. The symbol y is set to 'r' for read transactions and set to 'w' for write transactions. Transactions may be transported from FIFOs 150,160 to memory 180 at rate Rm. A return path for transactions from memory to the isochronous device 180 includes stages C and D. Response transactions may be transported from memory 180 to FIFO 190 at rate Rm. In other words, for purposes of this analysis memory 180 may be assumed to have an input rate equal to its output rate. This assumption may typical apply to high-speed memories.

Transactions may be transported from FIFO 190 over bus 135 at rate Rd to FIFO 115. Transactions may be output from FIFO 115 at isochronous rate Ra, in accordance with the X-T contract. In other words, an X-T contract may specify that response transactions be provided by the isochronous transport at the same rate at which read request transactions are received by the isochronous transport.

All rates may be expressed for purposes of illustration in units of transaction size. For example, for read requests Rbr may be expressed as a multiple of the size of a read request transaction. Rate Rd may be expressed as a multiple of the read response transaction size. When expressed as such, Rby and Rd may be defined as bus transaction rates.

Rate symbols in FIG. 1 may be interpreted according to the following definitions:

Symbol=Rxy

R=Rate x=Input stage y=Read or write. Not used when rate is identical for read and write transactions.

For example, Rbr is the bus read transaction rate into stage B. Ra is the isochronous data rate into stage A. In one embodiment this is the same for read and write requests (hence no read/write letter designation is utilized).

As previously described, transactions over a shared asynchronous bus may be subject to delays. These delays include collision delay, arbitration delay, and transmission delay. Collision delay is the delay which a transaction may encounter while awaiting another transaction on the bus to conclude. Arbitration delay is the delay which a transaction may encounter while other pending transactions are allowed to use the bus. Once a transaction is granted control of the bus, transmission delay is the time it takes to transport transaction data over the bus at the bus transaction rate.

Constraints may be placed on transactions over bus 135 to assist in determining suitable buffer sizes for the transport 100. It should be appreciated that the constraints described below are merely examples of one embodiment of the invention. Other constraints may be employed for different implementations as the application dictates. Those skilled in the art will appreciate that such constraints may be placed by coupling to the bus a bus controller which embodies and enforces such constraints. Of course, the invention is not limited to any particular technique for imposing said constraints, and numerous other possibilities for doing so are contemplated within the scope of the present invention.

In one embodiment, a maximum bus transaction size may be set for the bus 135. The maximum bus transaction size determines the maximum number of bytes of data which a transaction may comprise. Setting a maximum bus transaction size may place a bound upon the collision delay a transaction may encounter. The maximum bus transaction size may also constrain the maximum transmission delay encountered by a transaction. To place a bound upon the arbitration delay, a higher bus arbitration priority may be assigned to isochronous transactions output to the bus 135 from FIFOs 110,120 and response transactions output to the bus 135 by FIFO 190. The arbitration priority of these transactions may be set higher as compared to asynchronous transactions output to the bus 135 by connected asynchronous devices. However, this is only one possible embodiment. Any constraints on bus transactions which serve to bound the delay to isochronous transactions is within the contemplated scope of the invention.

In one embodiment, the value of T (the time period for the X-T contract) is selected such that an isochronous device coupled to the isochronous transport 100 may submit continuous read transaction requests. The device may also receive the corresponding continuous read return transactions. The isochronous device may also submit continuous write request transactions.

In symbols:

T=Isochronous time period

R=Size of read request transaction in bytes

W=Size of write request transaction in bytes

S=Size of read return transaction in bytes $$T = \max(R+S, W) * C$$

where C is a constant in units of seconds per byte. The actual value of C is determined by the isochronous rate of the X-T contract. For example, for an isochronous rate of 20 megabytes (MB) per second (s), C=1/20,000,000. Those skilled in the art will recognize the familiar max operator, which returns from among its arguments that which is highest in value.

Selection of this isochronous time period may allow an isochronous device to send a continuous stream of read request transactions to the data transport embodiment 100. The device may also receive a continuous stream of read return transactions, or send a continuous stream of write request transactions.

The bus transaction rates Rby and Rd may be set greater than the isochronous rate Ra. The rates Rby and Rd may be further set to a value less than memory rate Rm. For example a 20 MB/s isochronous device may interface to stage A. The bus 135 may comprise a 100 MB/s PCI bus. A 1000 MB/s memory bus may interface stages B and C to memory.

A strategy for determining buffer sizes for the transport 100 will next be described. This strategy is determined in light of constraints placed upon arbitration, transmission, and collision times for the bus 135.

In one embodiment each of the buffers may be set to a size determined at least in part by an effective drain rate for each of the buffers. The buffer sizes may be further determined, at least in part, by an output delay for each of the buffers. These buffer sizes may enable reliable isochronous data transport over the asynchronous bus 135 without excessive buffer sizes and without employing excessive flow control. An effective drain rate may be defined as the rate at which a buffer drains, taking into account the fill status of preceding buffers in the isochronous transaction path (the path which isochronous transactions travel through the data transport). One embodiment of a technique to determine the sizes for the buffers of an embodiment of a data transport employing FIFOs is provided in greater detail below.

Buffer sizes may be determined by examining delays at the buffer outputs. Delays at the output ports of stages A and C may be partially determined by delays which transactions encounter at the bus 135. As previously noted, the delay which a transaction encounters at bus 135 may comprise three components: a collision delay, an arbitration delay, and a transmission delay. In equation form:

$$D_{link} = D_{col} + D_{arb} + D_{trans}$$

The collision delay, Dcol, is the time which a transaction may wait for another transaction to complete before an opportunity to use the bus 135 arises. Dcol may be bounded by assigning a maximum transaction size for the bus 135.

The maximum transaction size may also set an upper bound for Dtrans approximately equal to the time it takes for the bus 135 to transmit a transaction with the maximum size.

The arbitration delay, Darb is defined as the delay encountered by a transaction wishing to use the bus 135, after the next opportunity to use the bus 135 arises. Arbitration delay may be encountered when the bus 135 becomes available, but other transactions with equal or higher priority are pending to use the bus 135.

Arbitration delay time may be determined by the specific arbitration rules used for the bus 135. Different implementations may employ different arbitration rules. These different arbitration rules may result in different delay times for arbitration. For example, a bus arbiter which gives higher priority to read requests may cause a write transaction to experience higher arbitration delay than a read transaction. The write transaction may experience higher arbitration delay when both read and write transactions are waiting to use the bus 135. In contrast, a bus arbiter which gives higher priority to write requests may cause a read transaction to experience higher arbitration delay than a write transaction. The read transaction may experience higher arbitration delay when both read and write transactions are pending on the bus 135.

Buffer sizes and delay terms are interdependent and it is helpful to proceed with the determination of buffer sizes before making a determination of delays.

In the following description, FIFO sizes are expressed in units of transactions. For example, if a read request transaction is 4 bytes, a read transaction FIFO with a size of 16 bytes would have a transaction size of 16/4=4 transaction units. FIFO output delays are expressed in a manner similar to transport rates:

Symbol=Dxy

D=Delay x=stage y=Read or write. Not used when delay is identical for read and write transactions.

In general, the size of each FIFO may be determined as a function of the fill and drain rates of the FIFOs as well as the output delay time. Symbols for expressing FIFO sizes are:

Symbol=FIFOxy x=Stage y=Read or write. Not used when same FIFO is used for read and write transactions.

Using these symbols, a FIFO size for stage A may be determined as:

FIFOar=ceiling[Ra*Dar]

FIFOaw=ceiling[Ra*Daw]

In other words, stage A FIFO sizes are determined by the fill rate (Ra) multiplied by the stage A output delay. The product is rounded up to the next multiple of the transaction size.

For computing the stage B FIFO size, two time periods may be considered. The first time period is the time during which the stage A FIFO is not fully drained. The second time period is the time after which stage A FIFO is fully drained. The value Rby−Ra is the effective drain rate of Stage A FIFO when Stage A FIFO is not fully drained. In other words, this is the effective rate at which Stage A FIFO depletes stored transactions by outputting them to bus 135. The rates are subtracted to account for the fact that the Stage A FIFO fills at a rate Ra even as it drains at rate Rby. The value Ra is the effective drain rate of Stage A FIFO when stage A is fully drained. In this state, transactions entering Stage A at rate Ra are effectively "passed through" to stage B over the asynchronous bus 135 at rate Ra.

The term FIFOay/(Rby−Ra) describes the time employed to completely drain Stage A FIFO once a buildup of transactions occurs in Stage A. As stated previously, the transaction rates may increase as the data flows toward the memory system 180. In other words, Ra<Rby<Rm. Assume the time it takes to drain the Stage A FIFO is greater than the Stage B output delay. Then the fill rate of the stage B FIFO is Rby. Otherwise, the stage B FIFO fills at rate Rby until the stage A FIFO is empty. The Stage B FIFO then fills at rate Ra for the remainder of the stage B output delay. This relationship may be expressed as:

FIFOby=Time during which FIFOay not fully drained+Time after FIFOay fully drained and filling at rate Ra Time during which FIFOay not fully drained:
ceiling[Rby*min(Dby,FIFOay/(Rby−Ra))]
Time after FIFOay fully drained and filling at rate Ra:
ceiling[Ra*max(0,(Dby−FIFOay/(Rby−Ra)))]

Note again that Rby is the transaction rate over the asynchronous bus 135. Thus, Rby may be different for read requests than for write requests. The two values may be different when the two types of transactions are of different sizes.

In one embodiment, only read return transactions are considered for the return path (stages C and D). In this embodiment, write requests do not generate return transactions.

For stage C, three time periods may be considered. The first time period is the time during which transactions output from Stage C are delayed. During this time the Stage C FIFO is filled by read return transactions from memory. These read return transactions are generated by read requests draining from Stage B to memory.

The second time to consider is the time during which transactions output from stage C are delayed and the Stage C FIFO is filled by read return transactions generated by read requests "passed through" Stage B to memory. In other words, Stage B is fully drained. The third time to consider is the time during which transactions output from Stage C are not delayed.

FIFOc=Transactions output from Stage C delayed and Stage B not fully drained+Transactions output from Stage C delayed and Stage B fully drained+Transactions output from Stage C not delayed Transactions output from Stage C delayed and Stage B not fully drained:
ceiling[Rm*min(Dc, FIFObr/(Rm−Rbr))]
Transactions output from Stage C delayed and Stage B fully drained:
ceiling[max(0,FIFObr/(Rm−Rbr)−Dc)*(Rm−Rd)]
Transactions output from Stage C not delayed:
ceiling[Ra*max(0,(Dbr−FIFObr/(Rm−Rbr)))]

Note that in this embodiment each read request transaction which passes from Stage A to Stage B may generate a read return transaction through Stages C and D.

We now return to the determination of delays for the various stages of the transport for this particular embodiment of the invention.

For Stage D, a delay may be applied on read return transactions at the output port of stage D. This delay may be applied to prevent the return of read return transactions before the time interval for the transaction determined by the X-T contract has arrived. The delay to impose may be determined by subtracting the minimum potential round-trip delay through the data transport embodiment from the maximum potential round trip delay.

Dmin=(1/Ra+1/Rb+1/Rm+1/Rd+Dm)

Dmax=Da+Db+Dc+Dm

Where Dm is the delay inherent in the memory in fulfilling a memory read request.

The size of the Stage D buffer may be computed as:

FIFOd=(Dmax−Dmin)*Ra

As previously noted, the collision time for the asynchronous bus 135 may be bounded by the maximum transaction size. The maximum transmission time may also be bounded by the maximum transaction size.

In one embodiment, the maximum arbitration time which a transaction may be subjected to may be determined in part by the arbitration priority rules. These rules may apply to read, write, and read return transactions. The maximum arbitration time may also be determined by the number of each transaction type which may be stored in buffers at a given moment.

As previously noted, in embodiments employing FIFOs, FIFO sizes may be expressed in units of transactions. The maximum number of transactions which may be pending in Stage A is Maximum number of pending read transactions stored in Stage A: FIFOar Maximum number of pending write transactions stored in Stage A: FIFOaw Likewise, the maximum number of read return transactions which may be pending in Stage C is Maximum number of pending read return transactions stored in Stage C: FIFOc In one embodiment, isochronous transactions pending on the asynchronous bus 135 may be granted priority over asynchronous transactions. Asychronous transactions are assigned a lower priority, and so may not contribute any delay to the arbitration time of isochronous transactions.

A delays may be encountered at the interface between Stage B and memory 180. Another delay may be encountered at the interface of memory 180 and Stage C. In one embodiment employing an asynchronous memory bus (not shown), these delays may be determined by terms similar to those which comprise the delays on asynchronous bus 135. That is, the total delay at the interface may comprise an arbitration delay, a collision delay, and a transmission delay.

In one embodiment, arbitration priorities may be assigned such that read request transactions have higher priority than read return transactions. Read return transactions may be assigned higher priority than write transactions. In this scheme, the maximum read request transaction arbitration time may be expressed as:

Darb, max=0

Read requests may incur no arbitration delay because they are assigned a higher arbitration priority than writes or read returns. Once the bus 135 is ready to accept the next transaction, the next pending read request transaction will by granted use of the bus 135.

For read return transactions,

Darb, max=bus_turn_time+FIFOar/Rbr

For half-duplex buses, the bus turn time is the time to switch bus signals from one direction to another (i.e. from in to out or vice versa). In this embodiment, FIFOar/Rbr is the time to drain all pending read request transactions from the stage A buffer.

For write transactions,

Darb(write)=Darb(read return)+bus_turn_time+FIFOc/Rd+bus_turn_time+(max_burst_transaction_period/2*T)

In other words, to be granted access to the bus, a write transaction may have to wait for the maximum number of pending read transactions to transfer over the bus 135 (Darb(read return)). The write transaction may then have to turn the bus and wait for the maximum number of read return transaction to transfer over the bus 135 (FIFOc/Rd), then turn the bus again. The final term (max_burst_transaction_period/2*T) places an upper limit on the delay resulting from a stream of continuous read transactions. Because write request transactions must wait for both read request transaction and read return transactions, this term places a boundary on the time a write transaction is required to wait at a transition between a read request transaction and a write transaction.

The term max_burst_transaction period represents the maximum number of isochronous periods T that may contain only read request transactions (or only write transactions). In one embodiment, a write transaction following a series of read request transactions may be delayed when it collides at the bus 135 with read return transactions. Sufficient buffering may be employed to hold this pending write transaction. The worst-case scenario is a series of max_burst_transaction period/2 write transactions following max_burst_transaction period/2 read request transactions. In this case buffering to accommodate max_burst_transaction period/2 pending write transactions may be employed. This term is therefore included in the formula for Darb(write) to determine the correct buffer space. In other words, when transaction traffic is continuous, after a time of max_burst_transaction_period/2*T, there must be a period T of no requests or a transition from read request transaction to write request transaction, or vice versa. If read request transactions were allowed to be continuously submitted forever, a write transaction pending on the bus 135 could be delayed forever. This term prevents that from happening.

Since rates increase toward memory, no additional delays will occur.

In the manner described, delays and buffer sizes for the four stages of the data transport embodiment 100 described may be more accurately determined. Reliable isochronous data transport over an asynchronous bus 135 may be accomplished without excessive buffer sizes or flow control.

Figure 2:
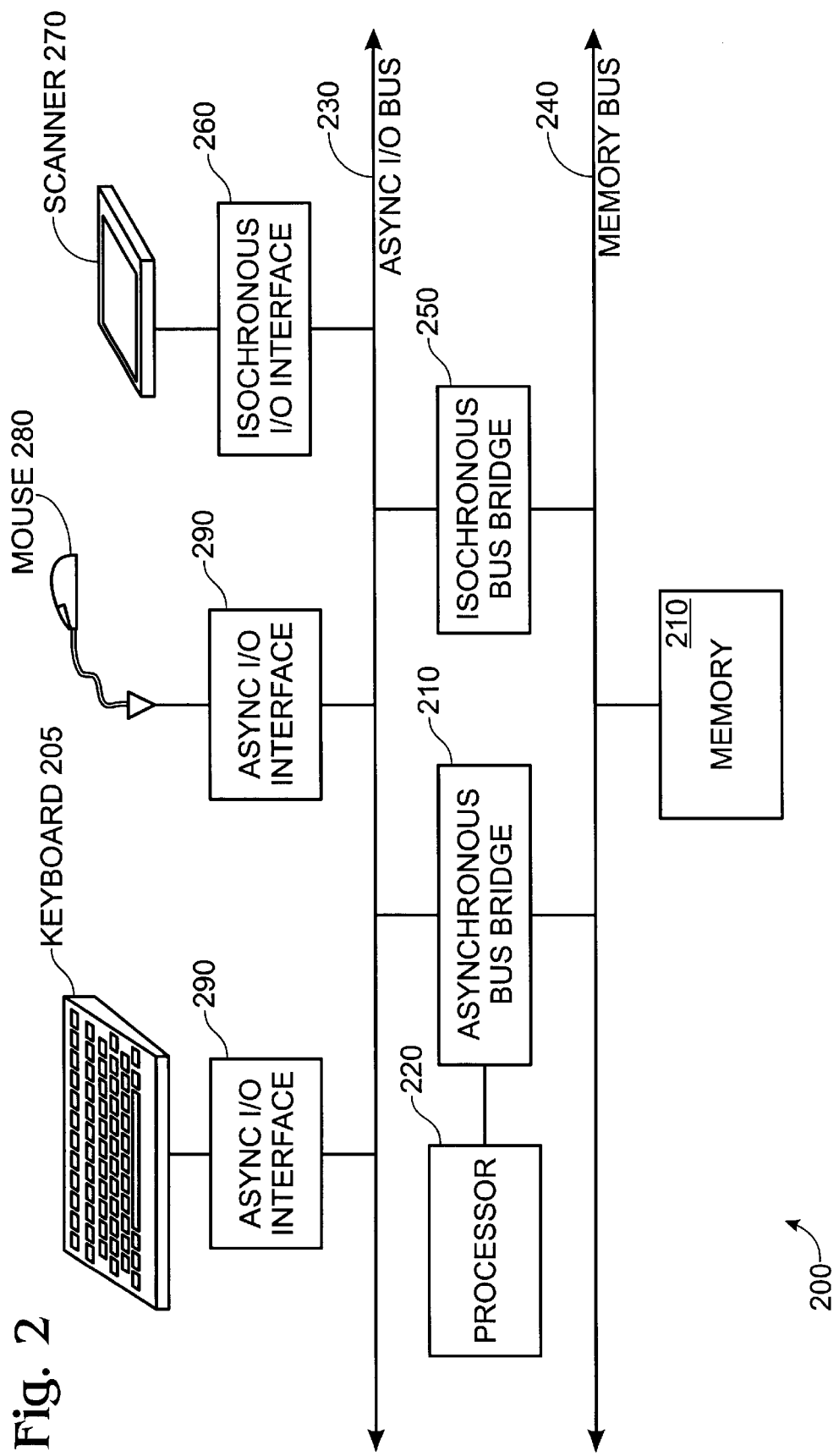
FIG. 2 is a schematic diagram illustrating an embodiment of a data processing device employing an embodiment of an isochronous data transport in accordance with the present invention.

FIG. 2 shows an embodiment 200 of a data processing device employing an embodiment of an isochronous data transport. Embodiment 200 comprises a processor 220 to execute instructions and read data supplied from a memory bus 240. Instructions and data are provided by a memory 210. The processor 220 may be implemented using any semiconductor fabrication technology and may execute any instruction set including, but not limited to, instruction sets supported by an Intel Corporation Pentium® processor or otherwise compatible processor. The system embodiment 200 may also include an asynchronous I/O bus 230 by which devices may exchange signals with the system. Memory bus 240 and I/O bus 230 may be implemented using technologies for propagating signals including, but not limited to, electronic and optical conductors. Memory 210 may include random access memory (RAM), read-only memory (ROM), or any other form of memory capable of storing instructions and data.

To perform signal input/output, embodiment 200 comprises a mouse 280, a keyboard 205 (in one embodiment, both mouse 280 and keyboard 205 are asynchronous devices), and scanner 270 (in one embodiment, an isochronous device), each coupled to I/O bus 230. An isochronous I/O interface 260 comprising, in one embodiment, stages A and C of the data transport embodiment of FIG. 1, may be employed to transport isochronous transactions from an isochronous device such as scanner 270 to I/O bus 230. An isochronous bus bridge 250, which in one embodiment comprises stages B and D of the data transport embodiment of FIG. 1, may be employed to transport isochronous transactions between I/O bus 230 and memory bus 240. The combination of isochronous I/O interface 260 and isochronous bus bridge 250 may provide isochronous device 270 with a reliable isochronous X-T contract for I/O transactions to memory 210, despite asynchronous transaction activity on I/O bus 230 generated by other asynchronous devices, such as keyboard 205 and mouse 280. Keyboard 205 and mouse 280 are coupled to I/O bus by way of asynchronous I/O interfaces 290. Asynchronous transactions on I/O bus 230 generated by asynchronous devices may be transported to memory bus 240 by way of asynchronous bus bridge 210. Of course, the invention is not limited in scope to this particular embodiment.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:

setting an arbitration priority for a read request transaction on an asynchronous bus greater than an arbitration priority for a read response transaction on the asynchronous bus, and setting the arbitration priority for a read response transaction on the asynchronous bus greater than an arbitration priority for a write request transaction on the asynchronous bus;

coupling a first device to the asynchronous bus to receive an isochronous transaction from an isochronous device and output the isochronous transaction to the asynchronous bus; and coupling a second device to the asynchronous bus to receive the isochronous transaction from the asynchronous bus and output the isochronous transaction to a third device.

2. The method of claim 1 in which setting a contention scheme for the asynchronous bus further comprises:

setting a maximum transaction size for the asynchronous bus.

3. The method of claim 1 in which setting a contention scheme for the asynchronous bus further comprises:

associating a higher bus arbitration priority to the isochronous transaction than to an asynchronous transaction.

4. A system comprising:

an asynchronous bus having a contention scheme comprising an arbitration priority for a read request transaction greater than an arbitration priority for a read response transaction, and further comprising an arbitration priority for a read response transaction greater than an arbitration priority for a write request transaction;

a first device coupled to the bus to receive an isochronous transaction from an isochronous device and output the isochronous transaction to the bus; and a second device coupled to the bus to receive the isochronous transaction from the bus and output the isochronous transaction to a third device.

5. The system of claim 4 in which the contention scheme of the bus further comprises:

a maximum transaction size for transactions on the bus.

6. The system of claim 4 in which the contention scheme for the bus further comprises:

a higher bus arbitration priority for the isochronous transaction than for an asynchronous transaction.

7. A method comprising:

receiving an isochronous transaction to a first buffer at a first rate;

transmitting the isochronous transaction from the first buffer to an asynchronous bus having a contention scheme such that the bus contention delay of the isochronous transaction is bounded;

receiving the isochronous transaction from the asynchronous bus to a second buffer at a second rate greater than the first rate.

8. The method of claim 7 further comprising:

setting a maximum transaction size for the asynchronous bus.

9. The method of claim 7 further comprising:

associating a higher bus arbitration priority to the isochronous transaction than to an asynchronous transaction.

10. The method of claim 7 further comprising:

setting an arbitration priority for a read request transaction greater than an arbitration priority for read response transaction, and setting the arbitration priority for a read response transaction greater than an arbitration priority for a write request transaction.

11. The method of claim 7 further comprising:

setting a maximum number of read request transactions and write request transactions which may be received sequentially by the asynchronous bus.

12. The method of claim 7 further comprising:

transmitting the isochronous transaction from the second buffer at a third rate greater than the second rate.

13. A method comprising:

setting a maximum number of read request transactions and write request transactions which may be received sequentially by an asynchronous bus;

coupling a first device to the asynchronous bus to receive an isochronous transaction from an isochronous device and output the isochronous transaction to the asynchronous bus; and coupling a second device to the asynchronous bus to receive the isochronous transaction from the asynchronous bus and output the isochronous transaction to a third device.

14. The method of claim 13 further comprising:

setting a maximum transaction size for the asynchronous bus.

15. The method of claim 13 further comprising:

associating a higher bus arbitration priority to the isochronous transaction than to an asynchronous transaction.

16. A system comprising:

an asynchronous bus having a contention scheme comprising a maximum number of read request transactions and write request transactions which may be received sequentially by the bus;

a first device coupled to the bus to receive an isochronous transaction from an isochronous device and output the isochronous transaction to the bus; and a second device coupled to the bus to receive the isochronous transaction from the bus and output the isochronous transaction to a third device.

17. The system of claim 16 in which the contention scheme of the bus further comprises:

a maximum transaction size for transactions on the bus.

18. The system of claim 16 in which the contention scheme for the bus further comprises:

a higher bus arbitration priority for the isochronous transaction than for an asynchronous transaction.

* * * * *